Oct. 30, 1923.

F. A. GESSLER

MILKING MACHINE

Filed March 28, 1917

Witness
R. C. Thomas

Inventor.
Frederick A. Gessler

Oct. 30, 1923.

F. A. GESSLER

MILKING MACHINE

Filed March 28, 1917    2 Sheets-Sheet 2

1,472,467

Inventor.
Frederick A Gessler

Witness
R. C. Thomas

Day & Day
attys

Patented Oct. 30, 1923.

1,472,467

UNITED STATES PATENT OFFICE.

FREDERICK A. GESSLER, OF MARTINS FERRY, OHIO, ASSIGNOR TO ELECTRIC MILKER CORPORATION, OF CHICAGO, ILLINOIS, A CORPORATION OF DELAWARE.

MILKING MACHINE.

Application filed March 28, 1917. Serial No. 158,013.

*To all whom it may concern:*

Be it known that I, FREDERICK A. GESSLER, a citizen of the United States of America, residing at Martins Ferry, in the county of Belmont, State of Ohio, have invented certain Improvements in Milking Machines, of which the following is a description, reference being had to the accompanying drawings, forming a part thereof.

The object of the invention is to provide a cow-milking apparatus, embodying units, each of which is complete in itself for use with one cow, and any number of which may be used in a battery for a plurality of animals, a common source of motor energy being applicable without the necessity for using pipe-lines or other general plant equipment.

Furthermore, it is an object of the invention to provide a pulsator mechanism whereby variations of pneumatic stress may be produced, consecutively, in a plurality of teat-cup connections when used simultaneously, as a set, for example, with one animal. This is in order, for instance, where sub-atmospheric pressure is applied normally to the suction cups, and periodic releases or lapses are produced by the reduction of the sub-atmospheric pressure or by substituting atmospheric or super-atmospheric pressure, that the releases or lapses may be made under conditions which will enable a group or cluster of cups to be self-supporting or self-retaining,—that cup in which the reduction occurs being supported by that or those in which the normal pressure is maintained, and the impression upon, or sensation of, the animal being substantially the same as that produced manually.

Further objects and advantages of the invention will appear in the following description of the preferred embodiment, it being understood that changes in the form, proportion and minor details may be resorted to within the scope of the appended claims without departing from the spirit of the invention.

Figure 1:
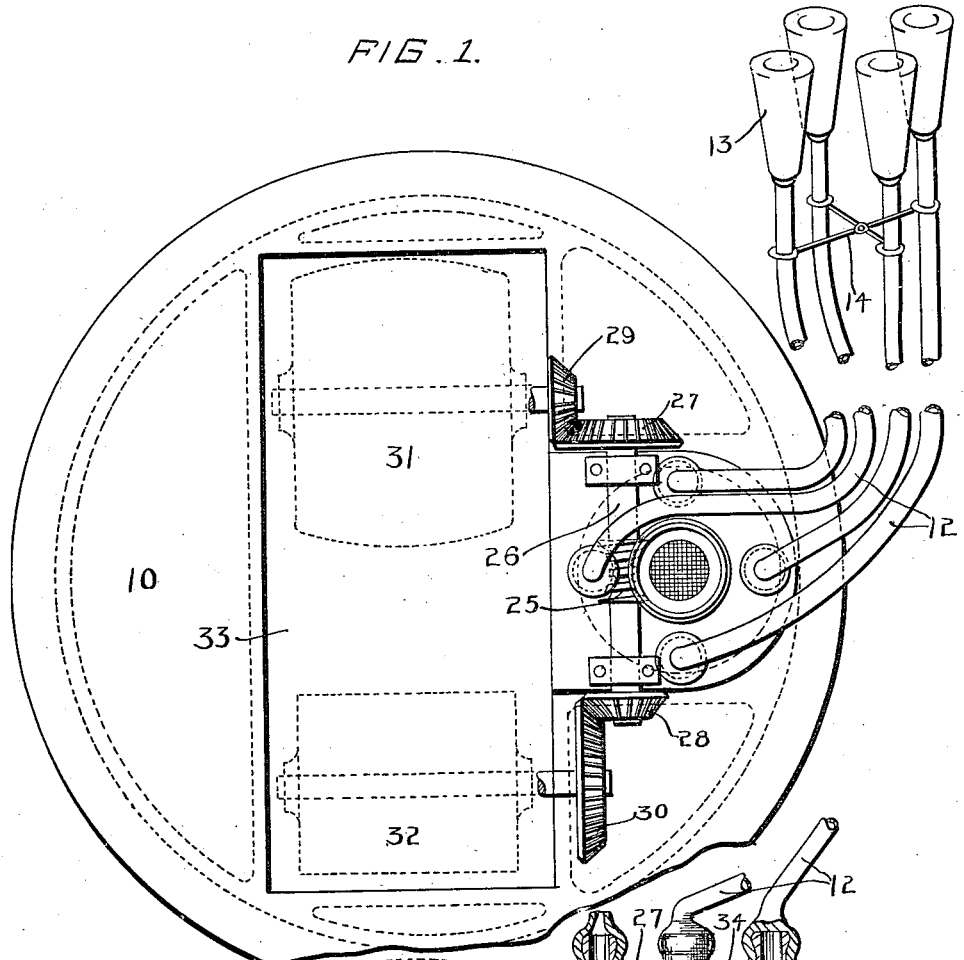
Figure 1 is a general plan view of an apparatus representing one embodiment of the invention.
Figure 2:
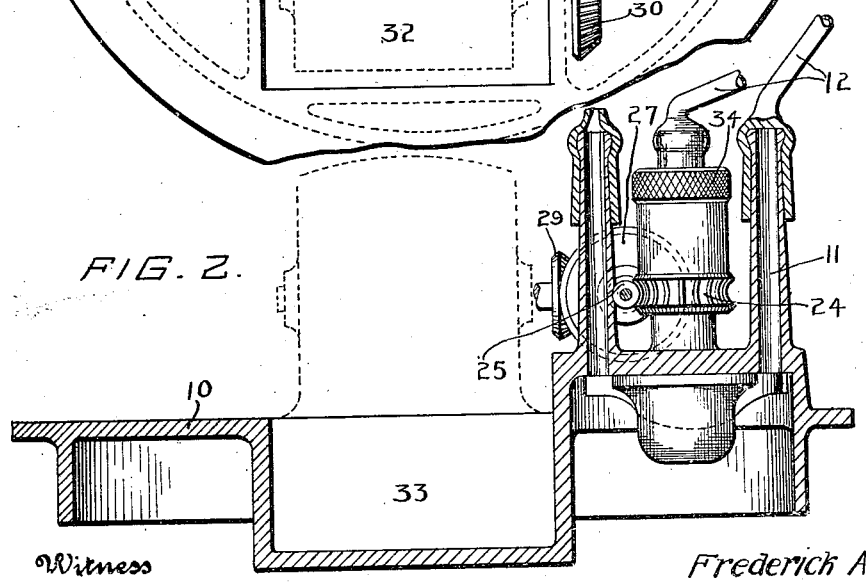
Fig. 2 is a transverse sectional view of a can-cover equipped with the apparatus.
Figure 3:
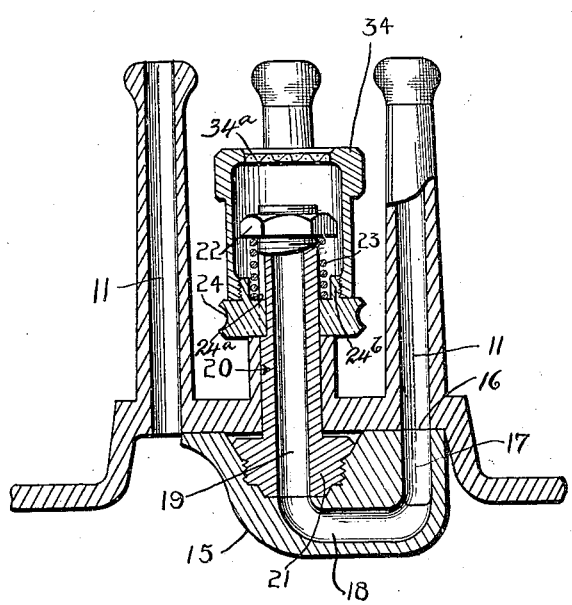
Fig. 3 is a detail sectional view of the pulsator mechanism.
Figure 5:
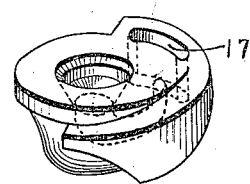
Fig. 5 is a perspective view of the same.
Figure 6:
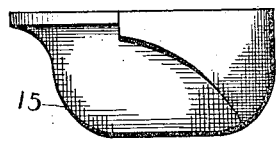
Fig. 6 is a side view of the valve.
Figure 4:
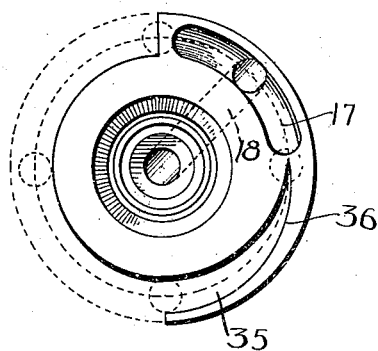
Fig. 4 is a plan view of the pulsator valve.
Figure 7:
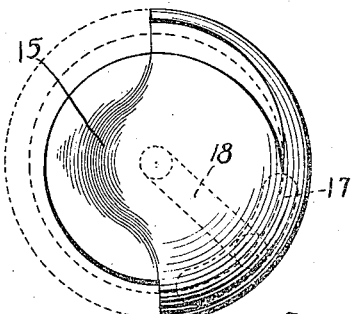
Fig. 7 is a reverse plan view of the same, showing the release port in dotted lines.

In the illustrated embodiment of the invention, the can-cover, shown at 10, carries a plurality of teat-cup connections for communication with the interior of the can, said connections embodying nipples 11 and flexible tubes 12 to which are attached cups 13, arranged in batteries, sets, or clusters, the elements of which are connected for mutual support by a spider 14.

Controlling the communication with the can of said connections, and, hence, as the atmospheric stress is dependent upon pressure in the can, controlling the pressure in the cups and connections, is a pulsator, mounted upon the can-cover and having a valve 15 which normally exposes one or more of the valve-seat ports 16, which are in communication with said connections to sub-atmospheric pressure, as from within the can, and one or more of the same to a less reduced pressure, which may be either atmospheric or super-atmospheric. To this end said valve may, as illustrated, have an elongated port or channel 17 communicating through a passage 18 with the bore 19 of the valve spindle 20. As shown, the head 21 of the spindle may be threaded for engagement with the valve and the spindle may carry a nut 22, or other adjustable member for regulating the tension of a spring 23 by which the valve is held to its seat.

It is vitally essential in devices of this kind that provision be made for ready disassembling of the parts so as to permit of sterilization of those elements which are exposed directly or indirectly to contact with the milk, and therefore keyed as at 24ᵃ on the stem or spindle of the valve is a worm-gear 24 with which meshes a worm 25, of which the spindle 26 carries bevel gears 27 and 28 for engagement, respectively, with gears 29 and 30, forming elements of a motor and a pump, shown diagrammatically at 31 and 32 in Fig. 1, removably arranged in a seat 33 in the can-cover. The motor, if of the electrical type, may be connected with any suitable source of energy, and the pump is in communication with the interior of the can of which the cover on which it is seated forms the lid, and both may be unseated and removed from the cover, disconnecting their gears 29 and 30 from the worm-spindle of the pulsator, and permitting the disassembling of the latter by the removal of the nut 22 and the dismounting of the spindle 20.

The bore of the valve spindle, the opening of which is controlled by the valve and forms an intake to reduce or break the sub-atmospheric pressure in the can and cup connections, is protected in practice by a cap 34, which, while permitting the entrance of air through gauze screen 34ª, precludes the passage of dust or other foreign matter. This cap is threaded on a flange 24ᵇ of the worm gear.

The motor being in operation to produce through the pump sub-atmosheric pressure in the milk-can upon which the cover is fitted, a revoluble movement of the valve of the pulsator causes a consecutive variation of atmospheric pressures in the cup-connections, and, in practice, while the release or reduction of sub-atmospheric pressure may be accomplished more or less abruptly, as by the communication of the channel 17 with the bore of the nipple to thus establish a connection between the nipple and the inlet 19, the restoration of the sub-atmospheric pressure should proceed gradually, and, to this end the port 35, whereby the valve controls communication between the interior of the can (or the suction device) and the nipples, and hence the cups, has a tapered or graduated entrance 36.

Thus, after a momentary lapse or reduction of sub-atmospheric pressure, the restoration of the predetermined sub-atmospheric pressure is secured gradually and continuously until it reaches the maximum, and is then maintained until time for the lapse or release,—three cups being simultaneously subject to the sub-atmospheric pressure while one is subject to the lapse or reduction of sub-atmospheric pressure. Owing to the fact that the cups are connected as hereinabove described for mutual support, the displacement of the cup which is subject to the lapse or reduction of sub-atmospheric pressure is prevented.

What I claim is:—

1. A pulsator for milking machines having a movable valve provided with a plurality of ports for successive communication with a plurality of teat-cup connections and respective communication with sources of atmospheric and sub-atmospheric pressures alternate ports being graduated, and means for operating the valve.

2. A pulsator for milking machines having a movable valve provided with ports for successive communication with a plurality of teat-cup connections and respective communication with sources of different pneumatic pressures, one of said valve-ports being graduated in area progressively, and means for operating the valve.

3. A pulsator for milking machines having a rotary valve provided with ports for successive communication with a plurality of teat-cup connections and respective communication with sources of different pneumatic pressures, one of which is sub-atmospheric, one of said ports having a guarded inlet and the other being graduated in area progressively, and means for operating the valve.

4. A pulsator for milking machines having a rotary valve provided with ports for successive communication with a plurality of teat-cup connections and respective communication with sources of different pneumatic pressures, one of which is sub-atmospheric, said valve having a hollow stem in communication with one of the valve ports, and a protective guard for the inlet end of said stem.

5. In a milking machine, a can cover provided with nipples for communication with the interior of the can, a rotary valve mounted upon the cover and provided with ports for successive communication with said nipples, said valve having a hollow stem mounted in a bearing in the can cover and detachably connected with the valve, yielding means for maintaining the seating of the valve, and means for operating the valve.

6. A cow-milking apparatus having a milk can cover provided with nipples for communication with the interior of the can, a rotary valve mounted upon the inner surface of the cover and provided with ports for successive communication with said nipples and having a hollow stem in communication with one of its ports, adjustable yielding means for maintaining the effective seating of the valve, a screening guard covering the inlet end of the hollow stem, and means for operating the valve.

7. A milk-can cover having a valve seat with ports for communication with the interior of a can fitted therewith, a valve mounted upon said seat and having ports for respective and consecutive registration with the ports of the seat and for respective communication with the interior of the can and a source of different pneumatic pressure from that within the can, one of said ports being elongated and tapering.

8. The combination with a milk-can and means for producing an abnormal atmospheric pressure therein, a valve-seat having a series of ports for communication with the interior being provided upon the can, of a valve having ports for respective and consecutive registration with those of the seat and respective communication with the interior of the can and a source of different pneumatic pressure from that within the can, one of said valve ports being elongated and tapering.

9. The combination with a milk-can and means for producing an abnormal atmospheric pressure therein, a valve seat having a series of ports for communication with the interior being provided upon the can, of a valve having ports for respective and consecutive registration with those of the seat and respective communication with the interior of the can and a source of normal atmospheric pressure, one of said ports being elongated and tapering.

10. A milk can having an interior valve seat provided with a series of teat-cup ports for communication with the interior of the can, means for producing sub-atmospheric pressure within the can, a continuously progressive valve having ports for respective and consecutive registration with the teat-cup ports and respective communication with the interior of the can and a source of pressure less attenuated than that within the can.

11. A milk can having an interior valve seat provided with a series of teat-cup ports for communication with the interior of the can, means for producing sub-atmospheric pressure within the can, a continuously progressive valve having ports for respective and consecutive registration with the teat-cup ports and respective communication with the interior of the can and a source of atmospheric pressure.

12. A milk can having an interior valve-seat provided with a series of teat-cup ports for communication with the interior of the can, means for producing sub-atmospheric pressure within the can, a rotary valve mounted on said seat and having a hollow stem forming an air inlet, said valve having ports for respective and consecutive registration with the teat-cup ports and respective communication with the interior of the can and said air inlet.

13. A milk can having an interior valve-seat provided with a series of teat-cup ports for communication with the interior of the can, means for producing sub-atmospheric pressure within the can, a rotary valve mounted on said seat and having a stem removably attached to the valve and mounted in a bearing in the can wall, yielding means connected with the stem for holding the valve seated, said valve having ports for respective and consecutive registration with the teat-cup ports and respective communication with the interior of the can and a source of normal atmospheric pressure, and means for operating the valve.

14. A milk can cover having an interior valve seat provided with teat-cup ports, a rotary port-controlling valve mounted upon said seat and having its stem mounted in a bearing in the can cover, a gear removably keyed upon the stem, a spring seated upon the gear, a nut threaded upon the stem for varying the tension of the spring; and means for actuating the gear to rotate the stem.

15. A milk can cover having an interior valve seat provided with teat-cup ports, a rotary port-controlling valve mounted upon said seat and having a hollow stem mounted in a bearing in the cover, a gear axially movable on the stem, yielding means tending to move the gear and stem in opposite direction, axially, to maintain the valve seated, a dust excluding cap removably mounted upon the gear and covering the extremity of the hollow stem, the valve having ports for respective and consecutive communication with said teat-cup ports and respective communication with the interior of the can and the bore of said hollow stem, means for producing an abnormal atmospheric pressure in the can and means for actuating said gear to operate the valve.

16. A cow-milking unit consisting of a milk can cover and a pulsator carried thereby and adapted for controlling variations of pneumatic stress, said cover having seats for a motor and a pump in combination with a motor and a pump mounted in said seats, the pulsator having means for detachable connection with the motor.

17. A cow-milking unit consisting of a can cover and a pulsator carried thereby and adapted for controlling variations of pneumatic stress, said cover having seats, in combination with a motor and a can exhausting pump fitted in said seats, and a pulsator having internal demountable means for disconnecting the pulsator and said motor and can exhausting pump.

18. A cow-milking unit consisting of a can cover and a pulsator carried thereby and adapted for controlling variations of pneumatic stress, said cover having seats, and the pulsator having a valve operating worm-gear and a worm shaft having gears, in combination with a motor and a can-exhausting pump mounted in said seats and provided respectively with gears adapted to mesh with those of said worm shaft.

19. In a milking machine, the combination with a set of teat cups, a milk receptacle, means for conveying the milk from the teat cups to the receptacle, and a vacuum connection, of a pulsator which is common to the several teat cups and includes a member which is movable to connect said teat cups in succession with said milk conveying means and to break said connection, and driving means for said pulsator member.

This specification signed and witnessed this 24th day of March, 1917.

FREDERICK A. GESSLER.

Witnesses:
 ED BROWN,
 ALBERT L. GESSLER.